UNITED STATES PATENT OFFICE.

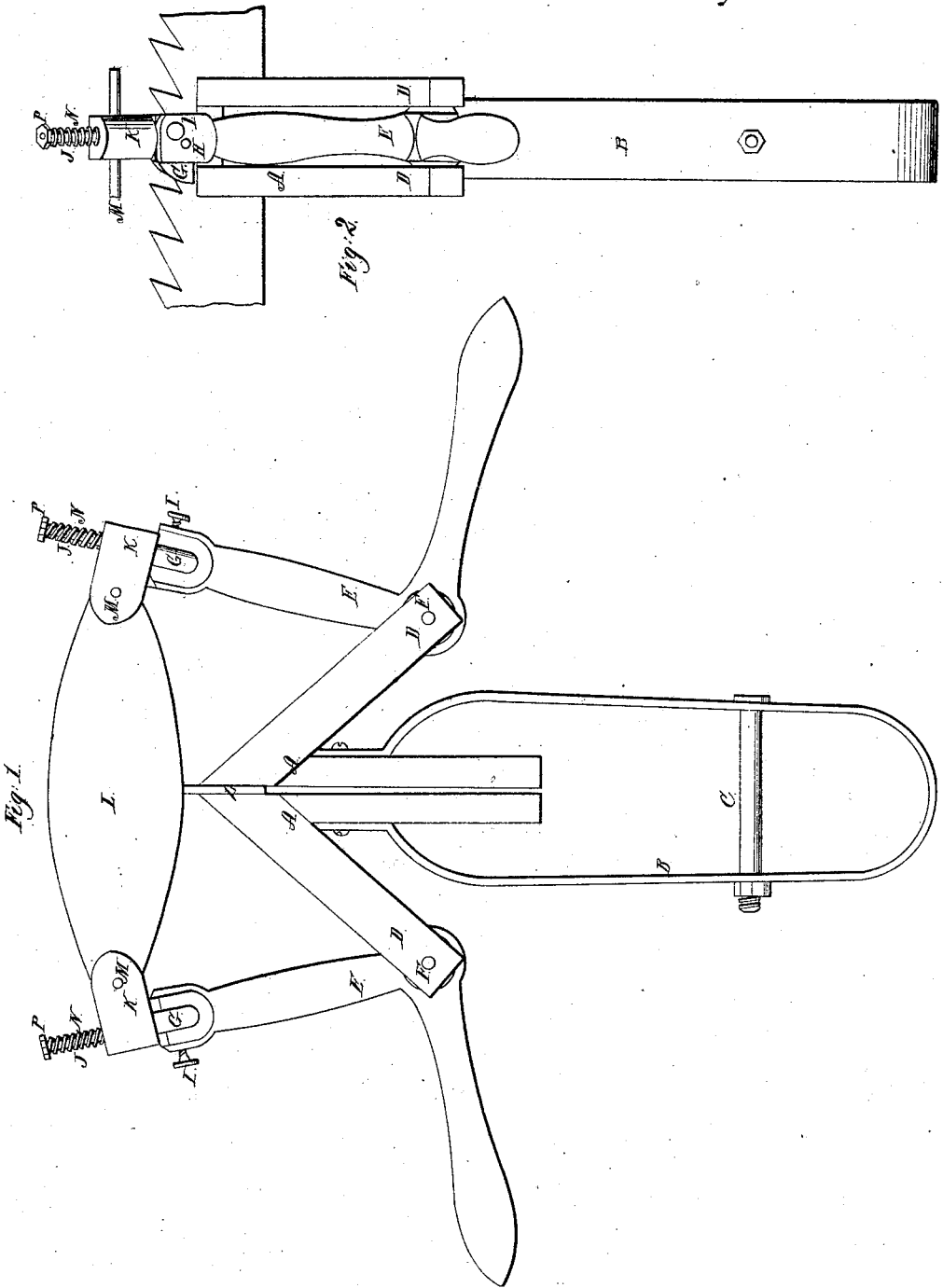

JASPER J. NEAR, OF ONEIDA, NEW YORK, ASSIGNOR TO NEAR & VANDUSEN.

SAW-FILER.

Specification of Letters Patent No. 18,224, dated September 15, 1857.

*To all whom it may concern:*

Be it known that I, JASPER J. NEAR, of Oneida, in the county of Madison and State of New York, have invented a new and useful Machine for Filing Saws; and I do hereby declare that the same is described and represented in the following specification and drawings.

To enable others skilled in the art to make and use my invention I will proceed to describe its construction and operation, referring to the drawings in which the same letters indicate like parts in each of the figures.

Figure 1, is an elevation of one side of the saw file. Fig. 2, is an elevation of one edge of the same.

The nature of my invention consists in a clamp to grip the saw to be filed, provided with vibrating arms which are hinged to the clamp and file, so as to carry the latter to file the saw, being pressed against it, by springs arranged at the ends of the vibrating arms for that purpose.

In the accompanying drawing A, A, are two jaws which grip the saw being connected together by the bow spring B, which is fastened to each of them and provided with a screw C, arranged to close the jaws A, A, upon the saw while it is being filed.

The jaws A, A, are provided with arms D, D, as shown in the drawing having the apex of the angular levers E, E, hinged to their extremities by the pins F, F, which pass through the arms and levers for that purpose, so as to permit the levers to vibrate freely on the pins during the operation of whetting the saw. There is a score in one end of each of the levers E, E, to which scores the quadrants G, G, are fitted, so as to vibrate on the pins H, H, which pass through the ends of the arms and the quadrants G, G, which are held in such position as may be desired by the set screws I, I, in the ends of the arms which screw against the quadrants.

The rods J, J, are fastened to or in the quadrants G, G, for the traversing joints K, K, to slide on, which joints are perforated, so as to traverse freely on the rods; and provided with a score for the ends of the file L, which is hinged to the joints by the pins M, M, shown in the drawing, which pass through the ends of the file and the joints for that purpose. The coiled springs N, N, are applied around the rods J, J, to press the joints toward the quadrants, and the file against the saw, when it is traversed by vibrating the levers E, E. The file L, may be pressed against the saw with greater or less force by adjusting the screw nuts P, P, on the ends of the rods J, J; which nuts act against the coiled springs N, N, for that purpose.

This machine is intended to file sawmill saws, while in the sash or frame, so as to save the trouble of removing them from or replacing them in the frame; and it may be applied to the saw by removing one of the pins M, and placing the jaws A, A, upon the saw and drawing them together by the screw C, so as to grip the saw and inserting the pin M, again; and adjusting the nuts P, P, to make the springs N, N, press the file against the saw as desired when the file may be traversed by vibrating the levers E, E.

The file may be traversed to file the front of the tooth first, and then the quadrants may be moved so as to bring the opposite side of the file against the back of the next tooth; or instead of moving the quadrants the jaws may be moved upon the saw. The jaws may be moved upon the saw to change the file from one score in the saw to the next, either with or without relaxing the screw C.

I believe I have described and represented my invention so as to enable any person skilled in the art to make and use it, I will now state what I desire to secure by Letters Patent to wit:

I claim—

A clamp to grip the saw substantially as described and carrying hinged (vibrating arms provided with springs for holding and operating the file substantially in the manner described.

JASPER J. NEAR.

Witnesses:
LEWIS BUNYEA,
LEON VAN DEUSEN.